(12) United States Patent
Gehris

(10) Patent No.: US 10,987,634 B2
(45) Date of Patent: Apr. 27, 2021

(54) METHOD AND DEVICE FOR FLUSHING DIFFUSIOPHORETIC WATER FILTER

(71) Applicant: Split Rock Filter Systems LLC, New Paltz, NY (US)

(72) Inventor: William C. Gehris, New Paltz, NY (US)

(73) Assignee: Split Rock Filter Systems LLC, New Paltz, NY (US)

( * ) Notice: Subject to any disclaimer, the term of this patent is extended or adjusted under 35 U.S.C. 154(b) by 0 days.

(21) Appl. No.: 16/728,625

(22) Filed: Dec. 27, 2019

(65) Prior Publication Data

US 2020/0206690 A1 Jul. 2, 2020

Related U.S. Application Data

(60) Provisional application No. 62/786,508, filed on Dec. 30, 2018.

(51) Int. Cl.
*B01D 65/02* (2006.01)

(52) U.S. Cl.
CPC .......... *B01D 65/02* (2013.01); *B01D 2321/04* (2013.01); *B01D 2321/16* (2013.01)

(58) Field of Classification Search
CPC .............................. B01D 65/02; B08B 9/027
See application file for complete search history.

(56) References Cited

U.S. PATENT DOCUMENTS

| | | | |
|---|---|---|---|
| 5,496,472 A | 3/1996 | Slack et al. | |
| 6,908,547 B2 | 6/2005 | Cote et al. | |
| 9,932,251 B2 | 4/2018 | Crooks et al. | |
| 10,155,182 B1 | 12/2018 | Gehris | |
| 10,463,994 B2 | 11/2019 | Gehris | |
| 10,632,401 B2 | 4/2020 | Gehris | |
| 2003/0121841 A1 | 7/2003 | Harttig et al. | |
| 2011/0198225 A1 | 8/2011 | Kim et al. | |
| 2015/0353376 A1 | 12/2015 | Hanover | |
| 2016/0375407 A1 | 12/2016 | Velegol | |
| 2017/0007968 A1* | 1/2017 | Hjelmsmark | B01D 63/082 |
| 2017/0218313 A1* | 8/2017 | Bhattacharjee | B01L 3/5027 |
| 2018/0201525 A1 | 7/2018 | Crooks et al. | |
| 2018/0257054 A1 | 9/2018 | Shardt et al. | |
| 2019/0151776 A1 | 5/2019 | Gehris | |
| 2019/0151795 A1 | 5/2019 | Gehris | |
| 2019/0151803 A1 | 5/2019 | Gehris | |

(Continued)

FOREIGN PATENT DOCUMENTS

| | | |
|---|---|---|
| CA | 2909003 | 4/2017 |
| CN | 103807457 | 5/2014 |
| WO | WO2015/077674 A1 | 3/2018 |

(Continued)

OTHER PUBLICATIONS

Shin, Sangwoo etal—Membraneless water filtration using CO2—Nature Communications, May 2, 2017 (Year: 2017).*

(Continued)

*Primary Examiner* — Bradley R Spies

(57) ABSTRACT

A diffusiophoretic water filter with a flushing system is provided. The flushing system preferably includes a reverse flow flushing system and/or a cleaning agent delivery system and/or a non-laminar flow flushing system. Methods are also provided.

19 Claims, 1 Drawing Sheet

(56) References Cited

U.S. PATENT DOCUMENTS

2020/0155984 A1  5/2020  Gehris
2020/0255299 A1* 8/2020  Stone .................... B01D 61/58

FOREIGN PATENT DOCUMENTS

| WO | WO-2018048735 A1 * | 3/2018 | .............. C02F 1/001 |
|----|--------------------|--------|---------------------------|
| WO | WO2019099586 A1    | 5/2019 |                           |
| WO | WO2020123802 A1    | 6/2020 |                           |

OTHER PUBLICATIONS

Meisen, A. etal—The Separation of Micron-Size Particles from Air by Diffusiophoresis—The Canadian Journal of Chemical Engineering, vol. 49, Aug. 1971 (Year: 1971).*

"Significance of Zeta Potential in the Adsorption of Fulvic Acid on Aluminum Oxide and Activated Carbon," Anielak et al., Polish Journal of Environmental Studies 20(6):1381-1386 • Jan. 2011.

"Influence of bacteria adsorption on zeta potential of Al2O3 and Al2O3/Ag nanoparticles in electrolyte and drinking water environment studied by means of zeta potential" Jastrzębska et al., Surface & Coatings Technology 271 (2015) 225-233.

"Adsorption of perfluorooctanoic acid and perfluorooctanesulfonic acid to iron oxide surfaces as studied by flow-through ATR-FTIR spectroscopy" in Environ. Chem. 2012, 9, 148-157, by Xiaodong Gao and Jon Chorover.

"Reverse Osmosis Pretreatment," downloaded on Jan. 14, 2018 from https://www.lenntech.com/ro/ro-pretreatment.htm, Jan. 4, 2008.

"Ultrafiltration" downloaded on Jan. 14, 2018 from https://www.lenntech.com/library/ultrafiltration/ultrafiltration.htm, Mar. 11, 2008.

Isaias:"Experience in reverse osmosis pretreatment," Desalination 139 (2001), 57-64, received Feb. 2, 2001.

Brunelle et al:"Colloidal Fouling of Reverse Osmosis Membranes," Desalination 32 (1980) 127-135, Jan. 1980.

"Diffusiophoresis at the macroscale" by Mauger et al. (arXiv: 1512.05005v4), Jul. 6, 2016.

"Origins of concentration gradients for diffusiophoresis" by Velegol et al, (10.1039/c6sm00052e), pp. 4686 to 4703, May 13, 2016.

Bessho et al.:"Adsorption Behavior of Beryllium(II) on Copper-oxide Nanoparticles Dispersed in Water: A Model for 7 Be Colloid Formation in the Cooling Water for Electromag nets at Hig h-energ y Accelerator Facilities," Analyticalsciences Nov. 2014,vol. 30, 1069-1074.

Shin et al. "Accumulation of Colloidal Particles in Flow Junction Induced by Fluid Flow and Diffusiophoreses," Physical Review X 7, 041038 (2017), Nov. 16, 2017.

\* cited by examiner

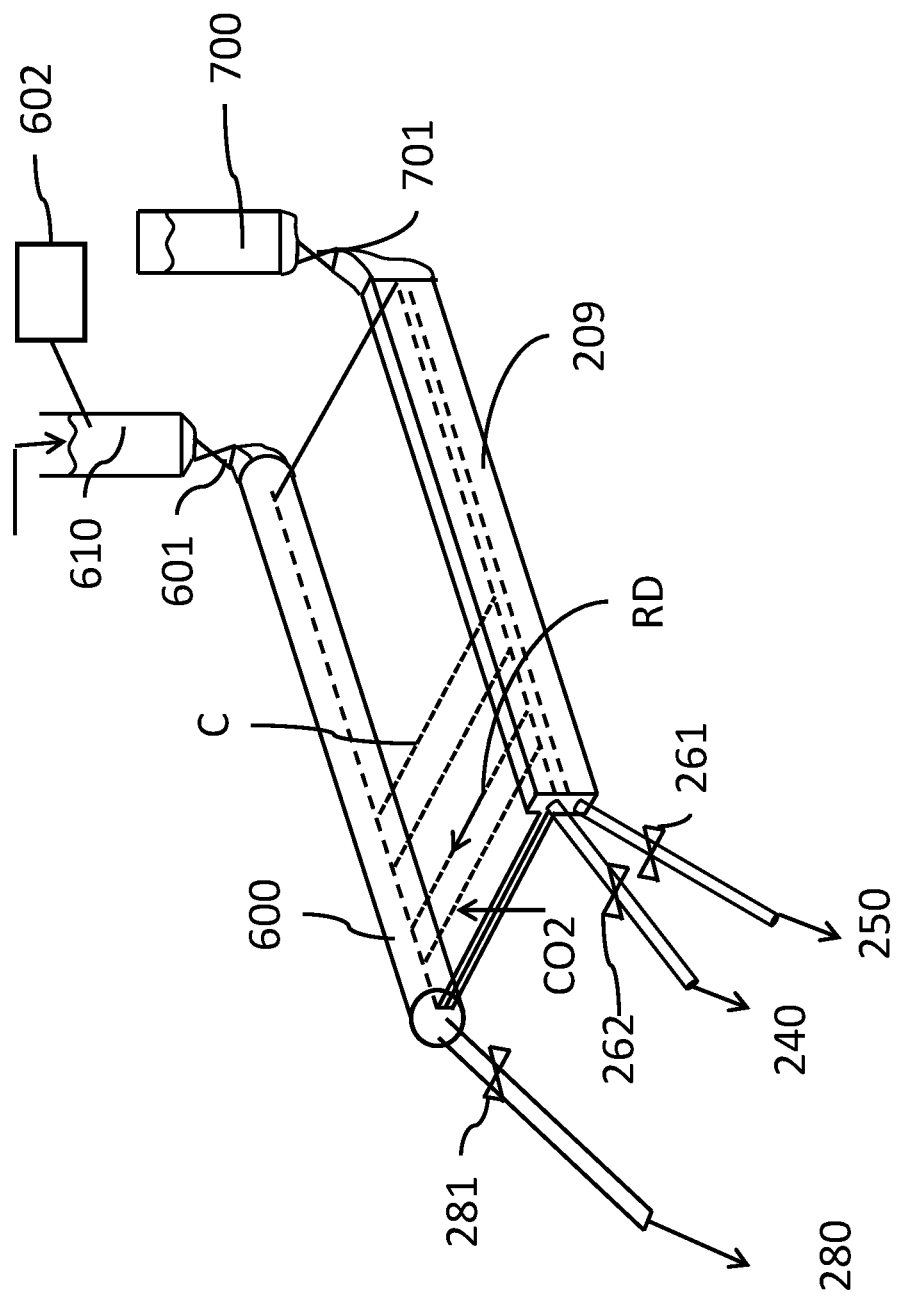

METHOD AND DEVICE FOR FLUSHING DIFFUSIOPHORETIC WATER FILTER

DESCRIPTION OF THE INVENTION

This claims priority to U.S. Provisional Patent Application No. 62/786,508, filed on Dec. 30, 2018 and hereby incorporated by reference herein.

Commonly-owned International Patent Application PCT/US18/61146, filed on Nov. 14, 2018 published as WO 2019/099586, U.S. Pat. No. 10,155,182 issued on Dec. 18, 2018 and U.S. Pat. No. 10,463,994, issued on Nov. 5, 2019 and PCT Application No. PCT/US19/65976, filed on Dec. 12, 2019 are all hereby incorporated by reference herein, in their entirety.

SUMMARY OF THE INVENTION

The present applicant has developed diffusiophoretic water filters with several if not thousands of channels in a gas-permeable sheet, for example made out of PDMS. The sheet in the device has a surface structured with channels having a general cross sectional shape that can be defined generally by a length, height and width. The sheet can be placed over another gas permeable sheet having a flat surface that then closes the channel in a water tight fashion. The channels thus have side by side inlet openings, and side by side split outlets as described in PCT Patent Application No. PCT/US19/65976.

An issue for diffusiophoretic water channels is clogging of the channels. Larger particles that have not been properly filtered upstream of the diffusiophoretic water filter can get stuck in the channels, especially at the outlet splitter which splits the channels. While the sheets can be separated and washed, this requires quite a bit of work, and the inlet manifold and outlet stream collector must be removed.

The present invention provides a method for flushing a diffusiophoretic water filter comprising: flowing water through the diffusiophoretic water filter in a direction opposite a normal flow direction.

By flowing the water in the opposite direction particles, such as those caught at the splitter, can be passed out the inlet and removed. Also, particles stuck to the channel material can be set free by the reverse flow direction.

The present invention also provides a diffusiophoretic water filter with a flushing system.

The flushing system preferably includes a reverse flow flushing system and/or a cleaning agent delivery system.

The present invention also provides a method for operating a diffusiophoretic water filter comprising: flowing water through the diffusiophoretic water filter in a laminar condition during operation and intermittently flushing the diffusiophoretic water filter by flowing water through the diffusiophoretic water filter in a non-laminar condition.

The non-laminar condition, for example a turbulent flow, can go in either direction, and shake up particles that are stuck to the material of the channels, which is preferably made of PDMS.

The present invention also provides a method for operating a diffusiophoretic water filter comprising: flowing a cleaning agent through the diffusiophoretic water filter. The cleaning agent preferably is a nontoxic fluid such as acetic acid (vinegar) in doses and contact times that do not alter the surface chemistry of the channels, which are made for example of silicone.

BRIEF DESCRIPTION OF THE DRAWINGS

FIG. 1 shows a preferred embodiment of the present invention.

DETAILED DESCRIPTION

A preferred embodiment is described with respect to FIG. 1, which shows schematically channels C running between an inlet manifold 600 and an outlet collector 209. During normal operation water with colloidal particles enters a pressure regulator 610 that passes water to inlet manifold 600. The colloidal particles are moved by diffusiophoretic motion and split so that a filtered stream 240 and a waste water stream 250 each exit outlet collector 209.

In one embodiment the filter has channels 200 micrometers thick, 500 micrometers wide and 800 mm long. An inlet pressure of 50 mbar (about 50 cm of colloid height) can produce a flow rate of 0.1 ml/min at a Reynolds number of 4.67 thus passes through the channels C which can number in the thousands or hundreds of thousands. The flow is thus laminar.

A reverse flushing system can include a pressure regulator, for example height regulator 700 and a flushing outlet 280 at inlet manifold 260. Shut-off valves 601, 701, 261, 262 and 281 for regulators 610, 700, outlets 240, 250 and flushing outlet 280 can be controlled by a controller or manually.

A cleaning agent delivery 602 can deliver a cleaning agent to the height regulator 610 and/or the regulator 700 or in any other manner to the collector 209 or inlet manifold 600.

During normal operation the valves 281 and 701 are closed, and valves 601, 261 and 262 open.

To reverse flush the filter, the valves 601, 262 and 261 are closed and then valves 701 and 281 opened. Water thus flows in reverse direction RD through the channels. Preferably the water is filtered water collected from stream 240 earlier and stored in regulator 700, which for example may be a water tower or reservoir on a roof a building containing the water filter.

The pressure can be for example 500 mbar, or at a height of 5 meters, and the flow can thus be turbulent with a Reynolds number of 46.7, the time to flush the entire device is on the order of 5 seconds, and thus the entire flushing method is very short.

Vinegar or other cleaning agents can be added during the flushing for a first period followed by a clean water period, so that for example after 1 second the entire device is clean and flushed.

The turbulent flow and cleaning agent also could be provided solely via regulator 610, for example by increasing the inlet water height. A reverse flushing system for a non-laminar flow flushing system thus is not necessary when non-laminar flow or a cleaning agent are used as the flushing system.

What is claimed is:

1. A method for flushing a diffusiophoretic water filter comprising:
   passing water through an inlet manifold of the diffusiophoretic water filter in a normal flow direction; and
   flowing water through the diffusiophoretic water filter in a direction opposite a normal flow direction and through the inlet manifold.

2. A method for operating a diffusiophoretic water filter comprising: flowing water via an inlet manifold of the diffusiophoretic water filter in a laminar condition during normal operation and intermittently flushing the diffusiophoretic water filter by flowing water through the diffusiophoretic water filter from or to the inlet manifold in a non-laminar condition.

3. A method for operating a diffusiophoretic water filter comprising:

passing water to be filtered via an inlet manifold of the diffusiophoretic water filter in a normal operating mode; and flowing a cleaning agent through the diffusiophoretic water filter, the cleaning agent being added to the water to be filtered upstream of the inlet manifold.

4. The method as recited in claim 1 wherein a cleaning solution is added to the water.

5. The method as recited in claim 1 wherein water is passed from the inlet manifold to a diffusiophoretic water filter outlet collector in the normal flow direction, and from the diffusiophoretic water filter outlet collector to the inlet manifold in the direction opposite the normal flow direction.

6. The method as recited in claim 5 wherein a reverse flushing system is connected to a diffusiophoretic water filter outlet collector, the reverse flushing system including a reverse flow pressure regulator.

7. The method as recited in claim 6 wherein the reverse flow pressure regulator is a height regulator.

8. The method as recited in claim 6 wherein the inlet manifold is connected to a pressure regulator via a shut-off valve, the shut off valve being open during normal flow and closed when the reverse flushing system is in operation.

9. The method as recited in claim 6 wherein the water passed through the diffusiophoretic water filter is split into filtered water and waste water, and the reverse flushing system uses the filtered water.

10. The method as recited in claim 1 wherein the water passed through the diffusiophoretic water filter is split into filtered water and waste water, and the water flowing in the direction opposite the normal flow direction is the filtered water.

11. The method as recited in claim 2 wherein the non-laminar flow flows in a direction opposite the flow occurring the normal operation.

12. The method as recited in claim 2 wherein a reverse flushing system is connected to a diffusiophoretic water filter outlet collector, the reverse flushing system including a reverse flow pressure regulator.

13. The method as recited in claim 12 wherein the water passed through the diffusiophoretic water filter is split into filtered water and waste water, and the reverse flushing system uses the filtered water.

14. The method as recited in claim 3 wherein the cleaning agent is nontoxic.

15. The method as recited in claim 14 wherein the cleaning agent is vinegar.

16. The method as recited in claim 1 wherein the flow in the opposite direction removes particles at a splitter past the inlet manifold.

17. The method as recited in claim 16 wherein the inlet manifold has a flushing outlet with a shut-off valve.

18. The method as recited in claim 11 wherein the non-laminar flow in the direction opposite the flow occurring during normal operation removes particles at a splitter past the inlet manifold.

19. The method as recited in claim 18 wherein the inlet manifold has a flushing outlet with a shut-off valve.

* * * * *